United States Patent
Waldrop et al.

(10) Patent No.: US 6,632,756 B1
(45) Date of Patent: Oct. 14, 2003

(54) AUTOMOTIVE FABRIC COMPOSITE

(75) Inventors: Anthony R. Waldrop, Easley, SC (US); George C. McLarty, Greenville, SC (US); Marc J. Balsa, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/504,831

(22) Filed: Feb. 16, 2000

Related U.S. Application Data

(60) Provisional application No. 60/120,551, filed on Feb. 17, 1999.

(51) Int. Cl.[7] .............................. D04B 1/18; D04B 7/14; B32B 5/18; B32B 5/26; A47C 31/00
(52) U.S. Cl. ...................... 442/314; 442/306; 442/308; 442/311; 442/313; 442/315; 442/318; 297/219.1; 297/218.1
(58) Field of Search ................................ 442/221, 306, 442/308, 311, 313, 314, 315, 318; 297/230.1, 232, 219.1, 250.1, 218.1; 66/192

(56) References Cited

U.S. PATENT DOCUMENTS

| | | | |
|---|---|---|---|
| 2,251,318 A | | 12/1937 | Blair et al. |
| 4,247,347 A | * | 1/1981 | Lischer et al. ............... 156/245 |
| 4,469,739 A | * | 9/1984 | Gretzinger et al. ..... 139/420 A |
| 4,545,614 A | | 10/1985 | Abu-Isa et al. ............. 297/284 |
| 4,803,118 A | * | 2/1989 | Sogi et al. ............... 428/316.6 |
| 4,869,554 A | | 9/1989 | Abu-Isa et al. ............. 297/452 |
| 5,013,089 A | | 5/1991 | Abu-Isa et al. ............. 297/452 |
| 5,533,789 A | * | 7/1996 | McLarty et al. ......... 297/284.1 |
| 5,807,794 A | | 9/1998 | Knox et al. ................. 442/306 |

OTHER PUBLICATIONS

Horrocks and Anand. Handbook of Technical Textiles. Woodhead Publishing Limited. Cambridge, England. pp. 501, 525.*

* cited by examiner

*Primary Examiner*—Terrel Morris
*Assistant Examiner*—Jenna Leigh Befumo
(74) *Attorney, Agent, or Firm*—Terry T. Moyer; John E. Vick, Jr.

(57) ABSTRACT

This invention relates generally to a fabric composite for disposition across an automotive seating frame and relates more particularly to a laminated fabric incorporating elastomeric yarn which has undergone either flame or adhesive lamination so as to be joined to a knit or woven aesthetic cover by means of foam either with or without adhesive.

11 Claims, 1 Drawing Sheet

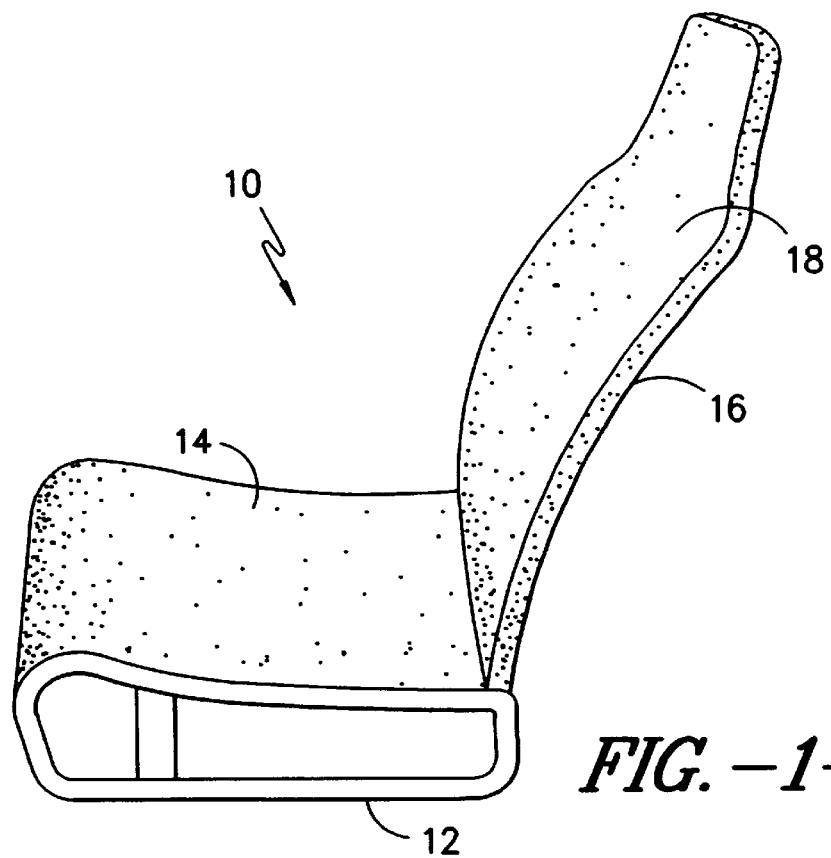
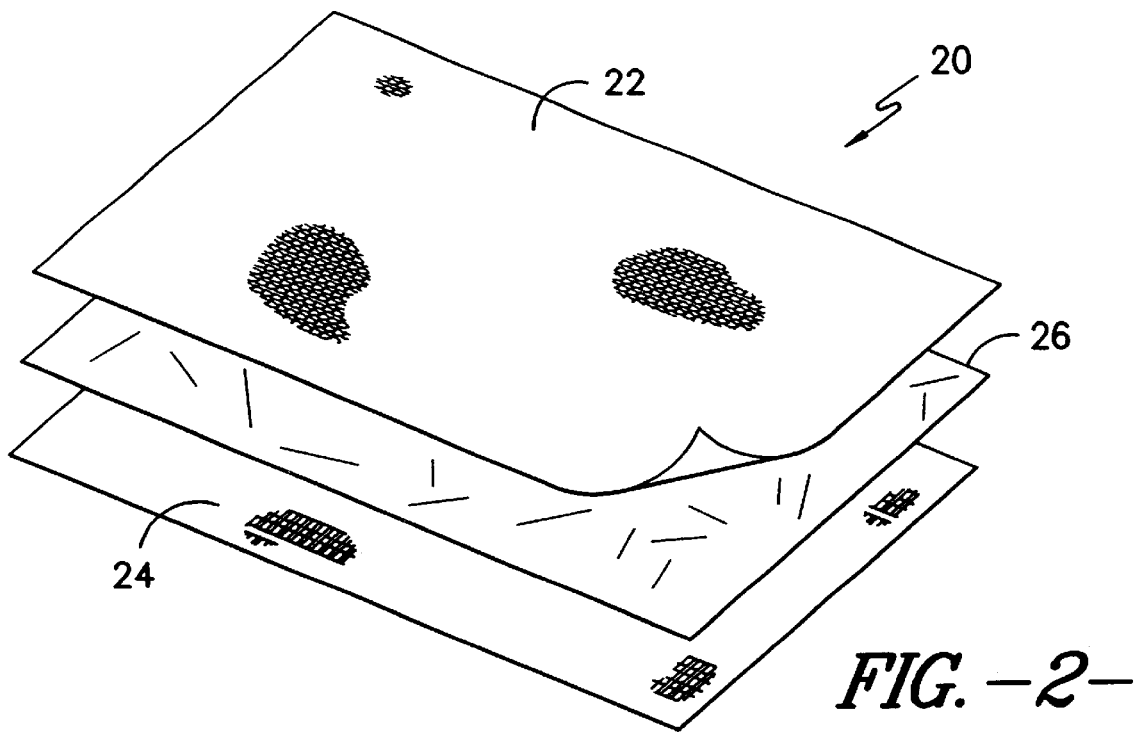

AUTOMOTIVE FABRIC COMPOSITE

This application is based upon U.S. Provisional Application No. 60/120,551 filed Feb. 17, 1999.

FIELD OF INVENTION

This invention relates generally to a fabric composite for disposition across an automotive seating frame and relates more particularly to a laminated fabric incorporating elastomeric yarn which has undergone either flame or adhesive lamination so as to be joined to a knit or woven aesthetic cover by means of foam either with or without adhesive.

BACKGROUND

Traditional seating structures typically are constructed from a frame, a surface fabric for contact with the user, and some type of support member. Typical support members have included springs, webs, straps, or molded units (e.g. thick foam pads). Materials for construction of such support members have been steel, burlap, canvas, plastic and elastomeric strapping and synthetic textile materials.

As will be readily appreciated, the use of a multiplicity of thick separate components (i.e. covers and separate springs or pads) which must be attached to a frame structure gives rise to a relatively complicated assembly practice. The use of such complex structures including automobile seats has been based upon the fact that the user must be provided with good support and a high degree of comfort generally associated with such configurations.

In order to reduce the number of components in seating structures and to reduce the bulk thereof, it has been proposed to provide thin profile seats, including thin seats using elastomer seat backing material. In U.S. Pat. No. 2,251,318 to Blair et al., solid rubber tape or strips reinforced by fabric are stretched over a seating frame. In U.S. Pat. No. 4,545,614 to Abu-Isa et al., (incorporated by reference) a thin profile seat is disclosed in which a multiplicity of side by side elastomeric filaments made from a block copolymer of polyterramethylene terephthalate polyester and polytetramethylene ether stretched across a vehicle seat frame. U.S. Pat. No. 4,869,554 to Abu-Isa et al. (incorporated by reference) discloses a thin profile seat in which elastomeric filaments like that of U.S. Pat. No. 4,545,614 are woven together to form a mat. The mat was pre-stretched to at least 5% elongation and attached to the seat frame. U.S. Pat. No. 5,013,089 to Abu-Isa et al. (incorporated by reference) discloses a seat assembly having an elastomeric filament suspension and a fabric cover. The filaments in the fabric cover are integrated by having the elastomeric filaments in the fabric knitted together to provide a low profile finished seat or backrest.

The present invention provides a laminated composite textile structure suitable for use in an automotive seat which incorporates a knitted or woven support structure having elastomeric yarns running in at least one direction which has been joined via a layer of laminated foam with or without an adhesive to an aesthetic surface fabric, thereby providing a unitary structure providing an aesthetic cover and elastomeric support. The resultant composite textile structure exhibits structural integrity under load conditions without delamination. The present invention thus represents a useful advancement over the state of the art.

OBJECTS AND SUMMARY OF THE INVENTION

In light of the foregoing, it is a general object of the present invention to provide a composite textile structure suitable for use in automotive seating applications.

It is a further object of the present invention to provide a fabric composite of use in an automotive seating structure including an elastomeric support textile joined to an aesthetic cover fabric such as woven or knit automotive fabric by a layer of laminated foam.

It is a feature of the present invention to utilize elastomeric yarns of synthetic material running through the support textile wherein the elastomeric yarns are characterized by an elongation at break of not less than about 70 percent.

It is a more particular feature of the present invention to utilize elastomeric yarns disposed through the support textile wherein the elastomeric yarns are characterized by an elongation at break of not less than about 90 percent.

According to a potentially preferred practice, it is a feature of the present invention that the elastomeric yarn is a bicomponent elastomeric monofilament having a sheath component and a core component wherein the sheath component has a melting point lower than that of the core component, although single component yarns may also be utilized.

According to yet a further potentially preferred practice, the elastomeric monofilament which is utilized is substantially stable with respect to ultraviolet irradiation.

Additional objects and features of the present invention will become apparent upon reading the following detailed description and upon reference to the drawings below.

BRIEF DESCRIPTION OF THE DRAWINGS

FIG. 1 is a perspective view of a seating structure incorporating a composite fabric according to the present invention.

FIG. 2 is an exploded view of a composite fabric for use in an automotive seating structure according to the present invention.

While the invention has been illustrated and will be described in connection with certain preferred embodiments and procedures, it is, of course, to appreciated that there is no intention to limit the invention to such particularly illustrated and described embodiments and procedures. On the contrary, it is intended to include all alternatives, modifications, and equivalents as may be included within the true spirit and scope of the invention.

DESCRIPTION OF PREFERRED EMBODIMENTS

Turning now to the drawings, in FIG. 1 there is shown a seating structure 10 according to the present invention such as may be used in an automobile environment. While the actual design of the seating structure 10 may be varied depending on the environment of use and aesthetic preferences, in general the seating structure will preferably include a seating frame 12, seating support surface fabric 14, a back frame 16 and a back support surface fabric 18. In the illustrated and potentially preferred embodiment, the seating support surface fabric 14 and the back support surface fabric 18 are disposed in tension over the seating frame 12 and back frame 16 respectively. While no added cushions or other support structures are illustrated, it is contemplated that such structures could be utilized if desired. In the event that such cushions or other structures are utilized, they typically will be disposed beneath the seating support surface fabric 14 and/or the back support surface fabric 18.

In the potentially preferred embodiment, the seating support surface fabric 14 and the back support surface fabric 16 comprise a three layered composite 20 as illustrated in FIG.

2. As illustrated, the fabric composite 20 for use in the seating structure 10 according to the present invention preferably includes a woven or knit cover fabric 22, an elastomeric fabric backing layer 24 which acts as a support scrim and an intermediate laminate layer 26 of foam either with or without an adhesive (not shown) thereby effecting joinder between the cover fabric 22 and the backing layer 24.

The elastomeric fabric backing layer 24 is preferably a warp knit, weft insertion product as illustrated and described in U.S. Pat. No. 5,807,794 (incorporated by reference) having bicomponent elastomeric yarns disposed in one direction. However, it is also contemplated that the elastomeric fabric backing layer 24 may be of a standard woven or knit construction such as a plain weave, basket weave, leno weave or other construction as may be desired. It is further contemplated that the elastomeric yarns may run in more than one fabric direction.

As illustrated in FIG. 2, the fabric composite 20 includes an intermediate laminate layer 26. The laminate layer is preferably a foam material such as polyether foam which has been flame laminated to both the cover fabric 22 and the elastomeric backing 24. Although flame lamination may be preferred, it is likewise contemplated that the foam may be adhesivly bonded between the cover fabric 22 and the elastomeric backing 24 by a separate resilient adhesive.

It has been found that through use of flame lamination of a polyether foam between the cover layer 22 and elastomeric backing 24, that excellent performance characteristics are obtained. Specifically, it has been determined that the bonding strength between layers is 4 Newtons per inch or greater and may be as high as about 25 Newtons per inch. In addition, the resulting structure has a burn rate of less than 4 inches per minute when tested according to Federal Motor Vehicle Safety Standard 302 without wires which will be understood to be a familiar test well known to those of skill in the art.

In the potentially preferred practice of the present invention, the foam intermediate layer disposed between the cover layer 22 and the elastomeric backing 24 is a polyether foam of the type well know for use in the production of foam laminated automotive upholstery. One potentially preferred foam is believed to be available from Olympic Products in Greensboro, N.C. The foam is preferably applied so as to result in a finished coverage level of about 1 to about 6 mm in thickness and preferably about 3 mm in thickness.

The resulting composite product exhibits substantial resistance to both sag and delamination. By way of example, when the composite 20 is complete and attached in the direction of the elastomeric yarns, to a square frame measuring twenty inches×twenty inches with 3–45 percent prestretch, the sag or movement from the horizontal plane will be 0.25 inches or less when a seventy pound (plus or minus one pound) weight is placed on an eight inch diameter plate at the center of the frame for fourteen continuous days at standard conditions of 70° F. plus or minus 5° F. and 50% plus or minus 5% relative humidity. In addition, under these test conditions no delamination is exhibited at any layer when a 165 pound weight is dropped 25,000 time from a height of 2 inches into the center of the stretched fabric.

The present product thus provides a composite product with the benefits of foam lamination possessing excellent structural integrity and thus provides a useful advancement over the state of the art.

We claim:

1. A seating support fabric composite comprised of a plurality of layers, wherein a first layer is comprised of a fabric selected from the group consisting of woven fabrics and knitted fabrics, a second layer is comprised of foam, and a third layer is comprised of a warp knit, weft insertion elastomeric fabric.

2. The fabric of claim 1 wherein said fabric is comprised of bicomponent elastomeric yarns disposed in one direction.

3. The fabric of claim 2 wherein said yarns have an elongation at break of not less than about 70 percent.

4. The fabric of claim 2 wherein said yarns have an elongation at break of not less than about 90 percent.

5. The fabric of claim 2 wherein said yarns are bicomponent elastomeric monofilament yarns having a sheath component and a core component, and wherein said sheath component has a melting point lower than that of the core component.

6. The fabric of claim 1 wherein said fabric is comprised of bicomponent elastomeric yarns disposed in more than one direction.

7. The fabric of claim 1 wherein said foam is a polyether foam that is bonded to said elastomeric fabric.

8. The fabric of claim 7 wherein said yarns are bicomponent elastomeric monofilament yarns having a sheath component has a melting point lower than that of the core component.

9. The fabric of claim 7 wherein said polyether foam is bonded by means of flame lamination.

10. A seating structure comprised of a frame to which is attached the seating support fabric composite of claim 8.

11. The seating structure of claim 10 wherein said fabric is disposed in tension over said frame.

* * * * *